United States Patent [19]

Bilger

[11] Patent Number: 4,626,423

[45] Date of Patent: Dec. 2, 1986

[54] PROCESS FOR THE PRODUCTION OF ALKALITHIOCYANATE

[75] Inventor: Edgar Bilger, Langenselbold, Fed. Rep. of Germany

[73] Assignee: Degussa Aktiengesellschaft, Frankfurt, Fed. Rep. of Germany

[21] Appl. No.: 849,588

[22] Filed: Apr. 8, 1986

[30] Foreign Application Priority Data

Apr. 20, 1985 [DE] Fed. Rep. of Germany ....... 3514408

[51] Int. Cl.$^4$ .............................................. C01C 3/20
[52] U.S. Cl. ................................................... 423/366
[58] Field of Search ........................................ 423/366

[56] References Cited

U.S. PATENT DOCUMENTS

| 1,958,209 | 5/1934 | Scott | 423/366 |
| 2,372,119 | 3/1945 | Riethof | 423/366 |
| 3,036,883 | 5/1962 | Rolingson | 423/366 |
| 3,047,363 | 7/1962 | Field et al. | 423/366 |

FOREIGN PATENT DOCUMENTS

| 243727 | 11/1960 | Australia | 423/366 |
| 737409 | 1/1970 | Belgium | 423/366 |
| 757136 | 3/1971 | Belgium | 423/366 |
| 29838 | 8/1974 | Japan | 423/366 |
| 739635 | 11/1955 | United Kingdom | 423/366 |

Primary Examiner—John Doll
Assistant Examiner—Wayne A. Langel
Attorney, Agent, or Firm—Beveridge, DeGrandi & Weilacher

[57] ABSTRACT

A process for the production of solid or dissolved alkalithiocyanate by reaction of dissolved alkalicyanide with an alcoholic sulphur suspension at the boiling point of the alcohol. The alcohol is distilled off as an azeotrope and the unreacted sulphur is separated. For the isolation of the solid product, a pH of 5–9 is adjusted in the solution obtained and thus a crystallization or evaporation is carried out.

12 Claims, No Drawings

PROCESS FOR THE PRODUCTION OF ALKALITHIOCYANATE

The invention relates to a process for the production of an aqueous solution of alkalithiocyanate or of solid alkalithiocyanate by reaction of a prepared aqueous alkalicyanide solution with a suspension of sulphur in a water miscible alcohol, distilling off the alcohol and optionally isolation of the solid product.

Alkalithiocyanates are used in the chemical and pharmaceutical industry, p.e. for the production of organic thiocyanates, isothiocyanates, mustard oils, herbicides, pesticides and biocides, in the photo industry for tinting, stabilizing and sensibilizing, for the production of etheral oils, in the production of polyacrylonitrile production and in the galvanic technology as a brightener.

Various methods are known to produce alkalithiocyanates by reaction of metal cyanides with elementary sulphur according to the equation:

$$MCN + S \rightarrow MSCN$$

wherein M is sodium or potassium.

Thereby, reactions are always preferred in which short reaction times are sufficient. A saponification of the cyanide and the formation of byproducts may be avoided thereby. Thus in Rom. R069.868 and in the Gmelin Manual of Inorganic Chemistry, 8th Ed. (1967) it is disclosed to produce alkalithiocyanate, by reaction of alkalicyanide, with sulphur in the aqueous medium at 90°–110° C. In this reaction, the activation energy necessary must be supplied by outside sources. The reaction times in this case are very long and range between 2–5 hours. During the reaction, alkali metal sulfide and ammonia are formed which must be removed prior to the isolation of the solid reaction product. The obtainable yields lie partially at only 95%. The process is therefore not suitable for a commercial scale production of alkalithiocyanate.

It has been known to accelerate the reaction of alkalicyanide with sulphur in an aqueous medium by adding small quantities of pyridine (Czech. 186.361). However, the yields are 80–90% and therefore low.

The synthesis of alkalithiocyanate from alkalicyanide with sulphur and water with subsequent adjustment of the pH value to pH <7.5 with $H_2SO_4$, known from Japanese Kokai 77 99,998, has the disadvantage that sulfate is brought in as a result and also the energy necessary for reaching the reaction temperature must be contributed by outside sources. Furthermore, it is known to produce alkalithiocyanate by reaction of alkalicyanide with sulphur in an aqueous medium in the presence of sulphur dissolving sulfides, such as ammonium hydrogen sulfide or alkali metal sulfide (U.S. Pat. No. 2,372,119). In case of this known process, the relatively large quantities of sulfide, required for this process, which must be removed in order to obtain the pure product, have a disadvantageous effect. A conversion in the presence of a wetting agent according to British Pat. No. 739,635 offers no additional advantage because of the required high temperatures of 100°–110° C. and the danger of saponification connected therewith.

It has further been known to make alkalithiocyanate by reaction of alkalicyanate with sulphur at the melting temperature of the sulphur (German Pat. No. 19 50 671). In this case, the reaction times range from 1 to 2 hours and are critical because of the danger of saponification. It is also evident in this conversion that the addition of alkali sulfide cannot be avoided. In a further step, $H_2O_2$ must be added for the removal of the sulfide and the sulfate which is formed in the reaction must be precipitated with barium carbonate. As a result, the process becomes expensive and uneconomic.

It has furthermore been known to produce alkalithiocyanate from alkalicyanide and sulphur in alcohol, ketones, esters or ethers (Japan Kokai No. 78 26 797). Although the reaction times are short, large quantities of solvents must be used because of the low solubility of the alkalicyanides and thiocyanates in organic solvents, in order to be able to operate in a homogeneous phase. In addition, it is necessary to begin with highly pure sodium cyanide, in order to obtain a highly pure product. Because of the wide limits of potential explosions and because of the toxicity of several of the proposed solvents, expensive work protective measures are necessary for this process, which renders the process unattractive.

Finally, it is been known (DE-OS No. 23 29 894) to produce alkalithiocyanate by conversion of a previously prepared aqueous alkalicyanide solution with a suspension of sulphur in a water miscible alcohol, distilling off the alcohol and optionally isolating the solid product.

The reaction time is at least 100 minutes, at the maximal reaction temperature of about 50° C., and is therefore still very long. Also, when propanol is used here, a distillative separation of the organic medium is not possible without considerable expense, because the boiling point ($\Delta T = 2.8°$) differs only slightly from that of water. Furthermore, the other proposed organic media can barely be distilled as pure solvents.

The present invention has as its objective the task of overcoming disadvantageous effects of prior art methods, such as long reaction times, formation of sulfide, saponification of the cyanide, too low a degree of conversion, expensive work protection measures, use of large quantities of organic solvents, high energy consumption and expensive purification of the product; and to achieve directly in nearly quantitative yield (a very pure alkalithiocyanate), which may be used without any further purification steps.

According to the broadest aspects of the present invention, the objective is attainable by providing a process for the production of an aqueous solution of alkalithiocyanate or of solid alkalithiocyanate by conversions of a previously prepared aqueous alkalicyanide solution with a suspension of sulphur in a water miscible alcohol, distilling off the alcohol and optionally isolating the solid product.

The process in more detail is characterized by the fact that the alkalicyanide solution at temperatures with a maximum of 50° C. is reacted with the suspension of sulphur in an alcohol with a boiling point of below 90° C., and wherein the sulphur is present in excess of at most 3%, preferably 0.5–2% by weight above the stoichiometrically required quantity, the conversion is carried out at the boiling temperature of the alcohol, the alcohol is distilled off as an azeotrope and the sulphur remaining therein is separated, and for the isolation of the solid product the remaining water, after adjustment of a pH of 5–9, preferably 6–8, is partly or completely evaporated.

It is preferred to use cyanide solutions with a content of 25–45% by weight. Preferably, the concentration when using NaCN ranges from to 27 to 33% by weight, when KCN is used, the concentration is in the range 37 to 43% by weight.

The conversion according to the present invention is exothermal and quickly reaches, as the reaction temperature, the boiling point of the azeotrope. A slight addition of energy is needed only in rare cases. The reaction times, when using alcohols boiling at about 80° C., are less than 45 minutes; in case of tertiary butanol reaction times are only 20 minutes or even less. In order to suppress the formation of alkali metal polysulfide, it is advantageous, to use an excess of sulphur of at most 3% by weight, preferably 0.5-2% by weight, especially 1% by weight, based on the stoichiometric amount.

After conclusion of the reaction, the alcohol is distilled off as an azeotrope and is again reused and the excess sulphur is filtered off. A product solution containing very pure thiocyanate results, which may directly be used for a variety of purposes or furnished for further processing. For the isolation of the solid product, the pH value is adjusted, for example, with hydrochloric acid to the desired value. The alkalithiocyanate obtained by crystallization from a concentrated solution or by complete evaporation of the water, for example, by thin layer evaporation or spray drying, is obtained in nearly quantitative yield (>99.5%) and has a purity of at least 98%, primarily >98.5%. A number of known techniques can be used to recover the solid product, as is apparent from the above.

The volume ratio of alcohol to water ranges preferably from 1:5 to 1:1. In the case when NaCN is used, a volume ratio of 1:2 to 1:3 is suitable, and in this case when KCN is used, a volume ratio of 1:1.5 to 1:2.5 is suitable.

As sulphur, powdered sulphur or crystallized sulphur with a grain size of below 1 mm to 5 mm may be used. As alcohol, ethanol, isopropanol or tertiary butanol are suitable. The last mentioned alcohol is preferred for purposes of the invention.

According to a particularly preferred embodiment of the invention, ammonium thiocyanate, in dissolved form or solid form is used for the adjustment of the pH value prior to the isolation of the solid product. In this way, it is possible to obtain a solid product with very little lump formations, which represents a considerable advantage for storing, transportation and handling.

The invention is illustrated and further explained in more detail in the following examples:

EXAMPLE 1

Production of sodiumthiocyanate using an ethanol/water-mixture with low alcohol content.

In a three necked flask, provided with a stirrer, reflux condenser and a closable inlet pipe for the introduction of the sulphur suspension, 50 g of NaCN 98.2% (1 mol) are dissolved in 100 ml $H_2O$. Then 33 g sulphur are suspended in 20 ml of ethanol and are added within 2 minutes to cyanide warmed to 50° C. As a result of the exothermic reaction, the temperature of the reaction mixture rises up to about 70° C.

In order to reach the reaction temperature (boiling temperature of the alcohol), heat energy must be continued to be fed in. The reaction time ranges up to 100 minutes. After completion of the reaction, the alcohol is distilled off and the non-reacted sulphur is filtered off. In the water clear filtrate, there is 94-98% by weight of sodiumthiocyanate, based on NaCN. The ethanol/water-azeotrope, which had been distilled off, may be used for further production. The reaction product is isolated by crystallization, after concentration. The dry, purely white product has a content of sodiumthiocyanate of 98.5%. The sulphide content is at maximum 0.003%, the cyanide contant at maximum 0.05%.

EXAMPLE 2

Production of sodiumthiocyanate using a 2-propanol/water-mixture with high alcohol content.

In a three necked flask, provided with stirrer, reflux condenser and closable inlet pipe for the dosing of the sulphur suspension, 50 g of NaCN 98.2% (1 mol) are dissolved in 100 ml of $H_2O$. 33 g of sulphur (1.03 mol) are suspended in 100 ml of 2-propanol and are added within 2 minutes to a cyanide lye warmed to 10° C. In this manner, the increased temperature of the prepared suspension suffices to contribute the necessary reaction heat in order to reach the boiling temperature of the alcohol within 20 minutes. The reaction time amounts to 45 minutes. After completion of the reaction, the 2-propanol/water-azeotrope is distilled off and the excess sulphur is filtered. In the light-brownish filtrate, there is obtained 98-99% sodiumthiocyanate, based on NaCN. In the product, isolated by spray drying, 0.01% of sulfide is detectable. The content of sodiumthiocyanate is 98.5%.

EXAMPLE 3

Production of sodiumthiocyanate using a tertiary butanol/water mixture with medium alochol content.

In a three necked flask, provided with a stirrer, reflux condenser and closable inlet pipe for the dosing of sulphur suspension, 500 g of NaCN 98.2% (10 mol) are dissolved in 1170 ml of $H_2O$. 323 g of sulphur (10.1 mol) are suspended in 500 ml of tertiary butanol and are introduced within 2 minutes to sodiumcyanide lye warned to about 30° C. As a result of the exothermal reaction, the temperature rises within 8-9 minutes to 82°-85° C. (boiling temperature of the azeotrope). The reaction temperature is held for the duration of 35-40 minutes. After completion of the reaction, the alcohol/water-azeotrope is distilled off and the excess sulphur is filtered. In the water clear solution there is 99.8% NaSCN, based on NaCN. After adjustment to a pH of 7.3 by addition of ammoniumthiocyanate and subsequent spray drying, the sodiumthiocyanate content in the dry, purely white product is 98.8%. The content of sulfide or cyanide is <10 ppm. The same reaction course may be conducted resulting in the same pure product when the azeotrope is used instead of the pure alcohol.

EXAMPLE 4

Production of potassium thiocyanate using a tertiary butanol/water-mixture with medium alcohol content.

In a three necked flask, provided with a stirrer, reflux condenser and closable inlet pipe for the dosing of the sulphur suspension, 65.6 g of potassiumcyanide 99.3% (1 mol) are dissolved in 100 ml $H_2O$ and are heated to 30° C.

33 g of sulphur (1.03 mol) are suspended in 50 ml of tertiary butanol and are added within 2 minutes. The reaction time lies between 14-22 minutes. After completion of the reaction, the azeotrope is distilled off and unreacted sulphur is filtered. In the water clear filtrate, there is found to be 99.5% by weight of potassiumthiocyanate, based on KCN. 750 mg of ammoniumthiocyanate are added to the filtrate and the reaction product is isolated by spray drying. The purity of the product is 99.2%. The content of cyanide or sulfide is at <10 ppm. The pH value of a 5% solution is at 7.5.

Further variations and modifications of the invention will be apparent to those skilled in the art from a study of the foregoing and are intended to be encompassed by the claims appended hereto.

The German priority application No. P 35 14 408.4 is relied on and incorporated herein by reference.

I claim:

1. Process for the production of alkalithiocyanate comprising mixing an aqueous alkalicyanide solution at temperature of up to a maximum of 50° C. with a suspension of sulphur in a water miscible alcohol having a boiling point of below 90° C., wherein the sulphur is present in excess of at most 3%, with reference to the stoichiometrically required quantity, carrying out the reaction at the boiling temperature of the alcohol, distilling off the alcohol as an azeotrope, and separating the sulphur that has not reacted.

2. The process according to claim 1, further comprising isolating the solid reaction product.

3. The process according to claim 2, wherein the solid product is isolated by concentrating the aqueous phase and then crystallizing out the alkalithiocyanate or by total evaporation of the residual water.

4. The process according to claim 1, further comprising isolating the solid reaction product after the pH is adjusted in the range of 5 to 9.

5. The process according to claim 4, wherein the pH is adjusted in the range of 6 to 8.

6. The process according to claim 1, wherein the volume ratio of alcohol to water lies at 1:5 to 1:1.

7. The process according to claim 6, wherein in case of use of sodiumcyanide, the volume ratio of alcohol to water lies at 1:2 to 1:3.

8. The process according to claim 6, wherein in case of the use of potassium cyanide, the volume ratio of alcohol to water lies at 1:1.5 to 1:2.5.

9. The process according to claim 1, wherein powdered sulphur or crystallized sulphur with a grain size of below 1 mm to 5 mm is used.

10. The process according to claim 1, wherein ethanol, 2-propanol or tertiary butanol is used as the alcohol.

11. The process according to claim 1, wherein ammoniumthiocyanate is used for the adjustment of the pH value prior to isolation of the solid product.

12. The process according to claim 1, wherein the sulphur is present in excess in the amount of 0.5 to 2% by weight.

* * * * *